3,099,141
SHAFT FOR USE IN NUCLEAR RADIATION ENVIRONMENT
Herbert Garten and Robert Herman Schaffer, Cincinnati, Ohio, assignors to General Electric Company, a corporation of New York
Filed Nov. 30, 1961, Ser. No. 156,189
8 Claims. (Cl. 64—1)

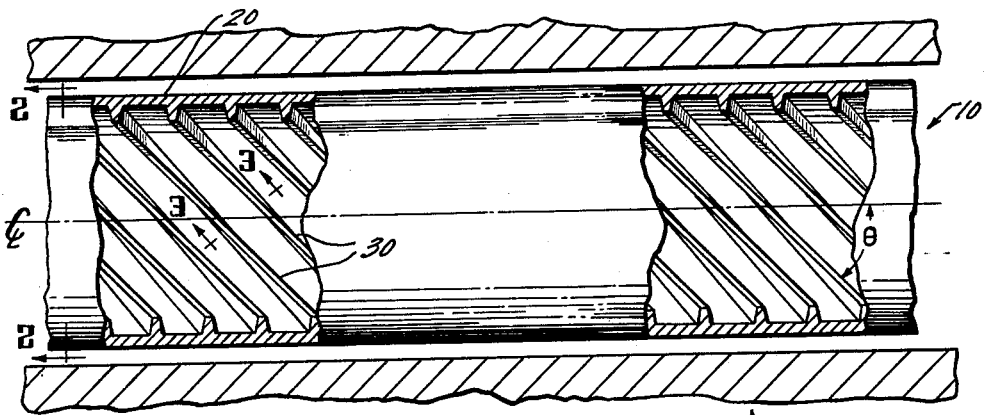
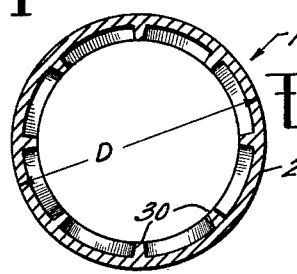 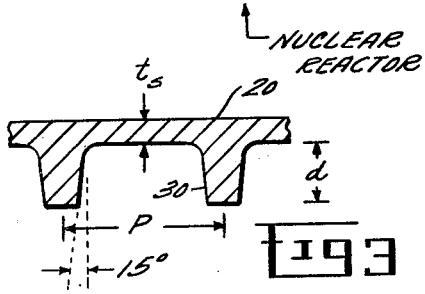
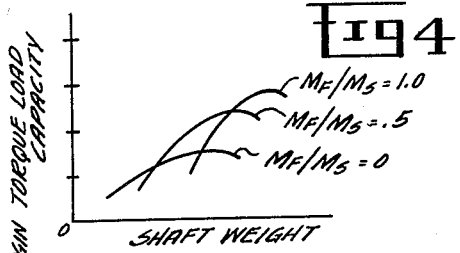 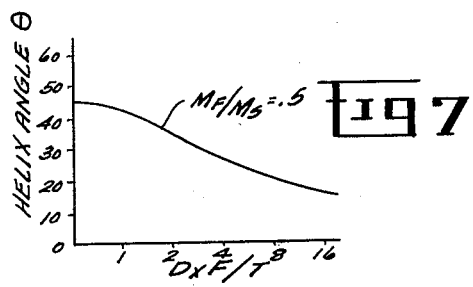
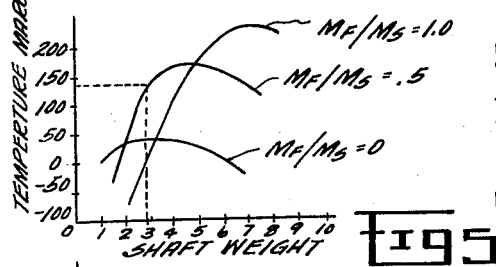 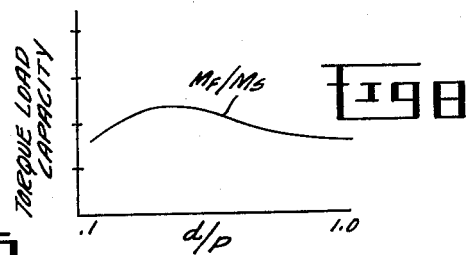
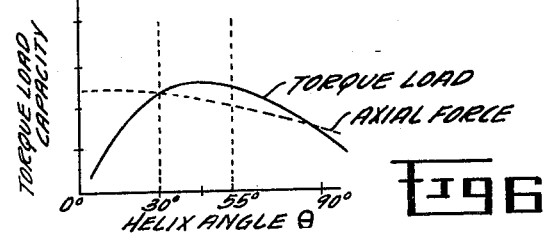
INVENTORS.
HERBERT GARTEN
ROBERT H. SCHAFFER
BY
Harry C. Burgess
ATTORNEY United States Patent Office 3,099,141
Patented July 30, 1963

This invention relates to a torque-transmitting member, and, more particularly, to a shaft for use in a nuclear radiation environment wherein heat induced in the member by radiation is substantially proportional to the mass of the member.

Recent studies have proven that nuclear flight at subsonic, and possible supersonic speeds is feasible. These studies have primarily been concerned with two different avenues of approach for a nuclear powered aircraft jet engine, namely, an "indirect" cycle and "direct" cycle configuration. In an "indirect" cycle nuclear turbojet aircraft engine the nuclear radiation source, or reactor is placed off to one side of the engine and the conventional chemical combustion chamber heat source is replaced by a large radiator. The radiator is kept hot by a closed-loop heat transfer system in which a fluid is circulated through the reactor and into the radiator and back to the reactor. On the other hand, in the "direct" cycle configuration the reactor replaces the normal chemical fuel combustion chamber of the turbojet engine and the engine airflow and the compressor power shaft pass through the reactor. Thus, a direct cycle nuclear turbojet engine may be described as an "in-line" engine, with the coupling shaft between the compressor section and the turbine section of the engine passing through the center of the reactor, or nuclear radiation source.

As in the conventional chemically fueled turbojet aircraft engine, the shaft must transmit both a torque load and an axial load. However, contrary to the situation in the conventional engine where a nuclear heat or radiation source is not present, heat is generated in the shaft as it passes through the reactor, the amount of which is substantially proportional to the mass of the shaft. While cooling air may be directed against the shaft in any one of a number of known ways, this may not be enough to off-set the increased heating effect of the nuclear radiation. Thus, contrary to the normal application where there is no limitation against strengthening of the shaft by simply increasing its mass, or weight, in a direct cycle nuclear engine a heavier shaft will run hotter. This is unacceptable because of the fact that the metallic materials of which such shafts are usually constructed normally lose their strength with increasing temperature. While it would appear that the shaft could be strengthened merely by increasing its diameter, for a nuclear turbojet application this will be undesirable since any increase in shaft diameter will be accompanied by a significant increase in reactor overall diameter. This, in turn, affects reactor shielding requirements adversely, so that the net result is an intolerable overall weight increase. The problem, therefore, becomes one of providing, in a nuclear environment, a shaft capable of maximum torque, or power transmission, the shaft being of minimum diameter and weight, since increasing weight becomes self-limiting in the shaft, it being clear that in any successful airborne application the total system weight is of critical importance.

Therefore, an object of this invention is to provide a shaft of minimum diameter and weight for use with a nuclear radiation source, which shaft has a configuration minimizing nuclear heat generation and temperature in the shaft, the shaft providing maximum power transmission.

In one embodiment, the shaft of the present invention comprises a hollow, cylindrical member having a fin (or fins) integral therewith, the fin being in the form of a helix having a predetermined angle and direction, the ratio of the total fin mass to the total mass of the member, excluding the fin, also having a predetermined value, wherein the fin acts as a load-transmitting member itself, thus providing maximum load carrying capability with minimum total shaft weight and heat generation in the nuclear radiation environment.

FIGURE 1 is a longitudinal view of the shaft, partially in cross section, in combination with a nuclear radiation source;

FIGURE 2 is a view taken along line 2—2 of FIGURE 1;

FIGURE 3 is a segment of a helical fin in cross section taken along line 3—3 in FIGURE 1 showing the relationship of the depth and pitch of the fin; and FIGURES 4, 5, 6, 7, and 8 are graphical representations of certain parameters governing the design of the invention.

Referring now more specifically to FIGURES 1 and 2, indicated generally by numeral 10 is a tubular member, or shaft. The tubular member, or shaft is preferably of one-piece construction and is adapted to transmit rotational force, or torque between a driving component and a driven component (not shown). For example, in aircraft applications the shaft may find use in a nuclear turbojet engine wherein in the usual manner one or more compressors are driven by one or more turbines downstream of the compressor. As seen in the drawing, the shaft extends through a nuclear radiation field, in this instance, a reactor. The shaft is a hollow, preferably cylindrical, seamless member, and includes a shell portion 20 and a plurality of fin portions 30. The shaft wall, or shell thickness $t_S$ is preferably relatively small so that the shaft, for a given diameter and length, can be more easily cooled.

As pointed out, when a metallic member, in particular, is used in a nuclear environment it will be subject to nuclear radiation such that heat is generated in the member, in this case the shaft 10. The heat so generated will be substantially proportional to the mass of the metal in the member. While the mass $M_S$ of the shaft 10 has been significantly reduced by the described thin-walled configuration, it will be apparent that with a given power transmission requirement a certain degree of structural strength in the shaft will still be required. Thus, the problem, as stated, is to provide sufficient power, or load transmission capability (in the case of a turbojet engine, torque load and axial load) with minimum weight in the nuclear radiation environment. Since a heavier shaft will run hotter and since metallic materials, especially, lose their strength with increasing temperature, the wall thickness $t_S$ cannot merely be increased.

As is well known, while a smooth shaft generally is most efficient in carrying a load, a finned shaft of an equivalent total mass will run cooler, thus raising the allowable stress in the shaft. However, the actual stress in commonly used finned shafts will be increased because the fins carry only an insignificant part of the load. This then raises the stress in the shell portion of the shaft as a result of the reduced mass thereof, since part of the original, or equivalent mass has been converted to fins. However, if the increase in the allowable stress exceeds this increase in actual stress, the use of such fins may be justified. But fins can only be justified in an airborne application if they do useful work, i.e., if they aid in power transmission. In other words, if the fins can be made to function as a structural portion of the shaft and not merely as a means for cooling the shaft, they will justify their use. Thus, while it was known to provide a shaft with fins for the purpose of cooling, it was not, prior to the present invention, readily apparent that the addition of fins to a shaft, which would seem at best a grossly inefficient way of increasing shaft strength, could solve the problem of increasing the torque or load transmitting ability of a shaft in a nuclear environment, without unduly increasing shaft diameter or weight.

Therefore, with a fixed shaft diameter and length, fixed flow rates and properties of the cooling fluid utilized, if any, and a fixed internal heat generation rate for the nuclear radiation source through which the shaft must pass, the inventors have devised preferred embodiments of the shaft determined by such parameters as the shape of the fin, or fins, 30, the angle of the helix formed by each fin as it spirals internally of the shaft along the shaft length, the direction of the helix, the total shaft mass $M_S$, and the total fin mass $M_F$. The relationships of these parameters are utilized to attain maximum shaft power transmission capability and minimum weight in a nuclear environment. Briefly, the inventors have optimized the fin helix angle $\theta$ and the direction of the helix in order that the fin carries as much of the loads as possible, thus minimizing the effective stress on the shell. Also optimized is the thickness of the shell so that too small a thickness is avoided, since stresses would be too high, and too great a thickness is avoided, since with the high temperatures of a nuclear heating environment, an undue increase in the thickness would cause such a decline in the material properties as would overbalance the reduction in stress and, although "beefed-up," the shaft would actually be less safe. Moreover, the shape and angle of the fins is chosen so as to minimize or eliminate the effects of manufacturing tolerance variations in the nuclear environment, i.e., uneven heating which may cause shaft bowing, or arcing.

In describing how the shaft is designed to achieve the desired load-carrying capability with any given shaft diameter in an application requiring minimum weight, particular reference is made to FIGURES 4 through 8. FIGURE 4 illustrates a parameter affecting the load-carrying capability of the member 10. In the graph, the torque load-carrying capacity is plotted as a function of the shaft weight for several values of the ratio of the total of fin mass $M_F$ to the total shaft mass $M_S$. To understand the significance of the curves, first consider the curve where the shaft is smooth, i.e., there are no fins ($M_F/M_S=0$). In this instance the torque load-carrying capacity is low in the nuclear environment for either a light or heavy shaft, although somewhat greater for some intermediate weight. The reason for this is that an extremely lightweight shaft is is easily cooled because the shaft wall is relatively thin. However, depending on the extent of the thinness there may not be enough shell material to carry the torque load for a particular application so that the shaft thickness, and the weight, may necessarily have to be increased. At first, cooling will still be reasonably effective and the material strength will decline comparatively slowly. Thus, additional material increases the load-carrying capacity and the curve in FIGURE 4 will rise. As the shaft thickness is increased still further in a nuclear radiation environment, however, the cooling becomes less effective and the shaft operating temperature rises rapidly. This drastically reduces the material strength the result being that the shaft is weakened faster than the additional material can make up the strength, causing the load-carrying capacity to fall again. Thus, for a given application (or temperature margin, in a nuclear radiation environment) one particular shaft thickness will produce the strongest shaft. The curves in FIGURE 4 are therefore characterized by a downward concavity. If the shaft is then provided with fins, for the reasons given above, the curves for different values at $M_F/M_S$ will still be characterized by a downward concavity.

Considering next the relationship between the curves, since, as stated above, the problem is one of obtaining the greatest load-carrying capacity in the peculiar environment of a nuclear radiation source, the effect on shaft design of the heat generation rise being proportional to mass increase will be examined. FIGURE 5, as well as FIGURE 4, indicates that the fins can increase the temperature margin (a corollary of load-carrying capacity in a nuclear radiation environment) significantly with predetermined increases in the $M_F/M_S$ ratio within a certain range of values. Thus, by selecting an optimum value for the shaft weight, a maximum temperature margin may be obtained. In the example given for a shaft weight of 3 units, chosen as an optimum for a smooth (unfinned) shaft, the best value of $M_F/M_S$ is .5 since it provides the greatest temperature margin (140°). It will be noted that increasing the fin mass beyond a certain point will not raise the load-carrying capacity significantly, even when the shaft weight is increased, since with too large a fin the resultant increase in shaft shell stress necessitates "beefing-up" the shaft to the point where, in a nuclear radiation field, the resultant temperature rise so weakens the material strength as to overcome the effect of the added weight. This, as pointed out, is not a problem in a non-nuclear environment. Also, as seen in the graph in FIGURE 5, the increase in $M_F/M_S$ from .5 to 1.0 accomplishes something less than the increase from 0 to .5. This indicates that for very large values of the ratio $M_F/M_S$, the full cooling effectiveness will not be attained, and, further, stress concentrations may become a limiting factor. Therefore, optimization of the finned shaft load-carrying capability for a desired minimum weight may be accomplished by use of the graphs in FIGURES 4 and 5. By choosing a desired torque load-carrying capacity (or temperature margin) and representing it as the ordinate of the graph, the abscissa may then represent the desired range of values for shaft weight. Curves for various ratios of the total fin mass to the total shell mass —$M_F/M_S$—can then be plotted. The first curve intersected by a horizontal line drawn at the desired torque load (or temperature margin) specifies the lightest shaft for the given conditions. The inventors have determined that the preferred value for the ratio $M_F/M_S$ will be greater than .2 but less than 1.5 for aircraft nuclear turbojet engine applications.

It should be understood that the fin ratio just discussed is a mechanical rather than a thermal parameter, i.e., since the ratio is the total amount of fin material to the total amount of shell material, it deals only with the load-carrying capacity of the fin member. On the other hand, the best thermal fin ratio, which is defined here as the ratio of the total surface area of the fin and shell portion combined, to that of the surface area of a comparable smooth surfaced cylinder of equal diameter, obviously will depend somewhat upon the amount and properties of the cooling fluid utilized, if any, in the particular application. In a nuclear radiation environment, larger thermal fin ratio values will reduce shaft fin temperature very effectively. However, the shell temperature will be reduced only slightly, so that the reduction in shell temperature is more than offset by an attendant increase in shell stress. The increase in thermal fin ratio virtually necessitates a simultaneous increase in $M_F/M_S$ which causes the attendant increase in shell stress. Thus, with the present invention, where the fins are provided with a load or torque carrying capability, it has been found that the optimum thermal ratio, as defined, which results is preferably on the order of approximately two to one.

Referring now to FIGURE 6 shown therein is one effect of differences in the value of the fin helix angle $\theta$ on the shaft load-carrying capacity. It will be noted that for pure torque loads an angle of approximately 45° is best, although it is not critical. For a shaft which carries a combination of axial and torque loads, such as in an aircraft turbojet, the curves in the FIGURE 6 indicate that the angle is optimum between 30° and 55°. However, it was determined that to avoid the effects of unbalance due to thermal bow of the shaft in the nuclear radiation environment, which causes one surface of the shaft to experience a greater temperature rise than the other, thus causing the shaft centerline to arc longitudinally, each fin should spiral at least one complete revolution. Thus, the angle of the helix is also dependent on the relationship of the diameter to the length of the shaft. The optimum value of the angle $\theta$ was therefore determined to depend primarily on two parameters. One of these is the ratio of the diameter D times the axial load F to the torque load T, or $D \times F/T$. For values of $D \times F/T$ less than 3, the optimum value of $\theta$ is between 30° and 55°; for values of $D \times F/T$ greater than 3, the optimum value of $\theta$ is from 0° to 30°. This is shown graphically in FIGURE 7. However, the value of $\theta$ must also be such as to insure that the relationship of the shaft diameter D to its length $s$ permits each fin, or helix to make approximately one complete revolution. Thus, changes in D, in $D \times F/T$, will also affect the relationship of D to $s$.

Further, the direction of a fin, or helix in a shaft will be found to coincide generally with the direction of the maximum torque load. For maximum torque load-carrying capacity in the nuclear environment it has been found that, additionally, the direction of the helix should be such that the torque load tends to tighten the spiral, thus putting the fins in tension, and increasing the load-carrying capacity of the shaft.

Finally, the graph in FIGURE 8 illustrates the fact that the fin shape must also be taken into consideration when optimizing the shaft and fin torque load-carrying capacity. In FIGURE 3 the configuration of the fin is depicted in terms of the relationship of the height, or depth of the fin $d$ to the pitch of the helix $p$. With a fin flank angle of approximately 15°, or in the range from 5° to 30°, and a substantial fillet approximately equal to the shell thickness at the base of the fin, to reduce stresses, the fin shape which combines the best heat transfer or cooling properties with mechanical strength for load-carrying capabilities will have a configuration substantially as that shown in FIGURE 3. In the embodiment shown the fin slenderness ratio $$\frac{d}{p}$$

for maximum load-carrying capacity is approximately .3; but, in any event, in the range from .1 to 2.0. This range will also give the greatest fin cooling effectiveness with a maximum strength and minimum weight in the nuclear environment.

Thus, the inventors have provided a new and useful torque and axial load-transmitting member for use in a nuclear radiation field wherein the heat generated in the member, as a result of nuclear heating, will be substantially proportional to the mass thereof. The member has a hollow shell and helical fins integral with either the outer surface of the shell, or the inner surface of the shell, or both. Further, the helix direction is to be determined by the direction of the torque load, and the preferred value of the ratio $M_F/M_S$ is greater than .2 but less than 1.5, the preferred angle of the helix is greater than 30° but less than 55°, the value of the ratio $$\frac{d}{p}$$

(as measured perpendiculuar to the fin helix angle) is preferably greater than .1, but less than 2.0, with the fin proportioned in a manner so that its flank angle is greater than 5° but less than 30°, and the thermal fin ratio is approximately 2 to 1, in order that the shaft will provide maximum power transmission with minimum overall weight in the nuclear radiation field.

What we claim and desire to secure by Letters Patent is:

1. A load transmitting member for use in a nuclear radiation environment wherein the temperature rise in the member is substantially proportional to its mass, said member comprising:
   a hollow, cylindrical shell portion, said shell portion transmitting a part of said load and having a total mass $M_S$;
   a fin integral with said shell portion, said fin comprising a helix extending the length of the shell portion and having a total mass $M_F$,
   wherein the ratio of the fin mass to the shell mass—$M_F/M_S$—is greater than .2 but less than 1.5,
   so as to enable said fin to transmit the remaining part of said load at a minimum total weight of said member in said nuclear radiation environment.

2. A load transmitting member for use in a nuclear radiation environment wherein the temperature rise in the member is substantially proportional to its mass, said member comprising:
   a hollow, cylindrical shell portion, said shell portion transmitting a part of said load;
   a fin integral with said shell portion, said fin comprising a helix extending the length of the shell portion and having a height $d$ and a pitch $p$,
   wherein the ratio of the fin height to the fin pitch—$d/p$—is greater than .1 but less than 2.0,
   so as to enable said fin to transmit the remaining part of said load at a minimum total weight of said member in said nuclear radiation environment.

3. A load transmitting member for use in a nuclear radiation environment wherein the temperature rise in the member is substantially proportional to its mass, said member comprising:
   a hollow cylindrical shell portion, said shell portion transmitting a part of said loading and having a total mass $M_S$,
   a fin integral with said shell portion, said fin comprising a helix extending the length of the shell portion and having a height $d$ and a pitch $p$,
   wherein the ratio of the fin height to the fin pitch—$d/p$—is greater than .1 but less than 2.0,
   and wherein the ratio of the fin mass to the shell mass—$M_F/M_S$—is greater than .2 but less than 1.5,
   so as to enable said fin to transmit the remaining part of said load at a minimum total weight of said member in said nuclear radiation environment.

4. A torque load transmitting member for use in a nuclear radiation environment wherein the temperature rise in the member is substantially proportional to its mass, said member comprising:
   a hollow, cylindrical shell portion, said shell portion transmitting a part of said load;
   a fin integral with said shell portion, said fin comprising a helix extending the length of the shell portion and having a height $d$ and a pitch $p$ and an angle $\theta$;
   wherein the ratio of the fin height to the fin pitch—$d/p$—is greater than .1 but less than 2.0,
   and wherein the direction of the helix is such that twisting in said member due to the torque load will tend to tighten said angle $\theta$ of the helix,
   so as to enable said fin to transmit the remaining part of said load at a minimum total weight of said member in said nuclear radiation environment.

5. A torque and axial load transmitting member for use in a nuclear radiation environment wherein temperature rise in the member is substantially proportional to its mass, said member comprising:
   a hollow, cylindrical shell portion, said shell portion transmitting a part of the axial load F and the torque load T, said shell portion having a diameter D;
   a fin integral with said shell portion, said fin comprising a helix extending the length of the shell portion;
   wherein the angle of said helix is such that when the value of the ratio $D \times F/T$ is less than 3, the optimum helix angle will be greater than 30°, but less than 55°, and when the value of the ratio is greater than 3, the optimum helix angle will be less than 30°, so as to enable said fin to transmit the remainder of said loads F and T at a total minimum weight of said member in said nuclear radiation environment.

6. A torque and axial load transmitting member for use in a nuclear radiation environment wherein temperature rise in the member is substantially proportional to its mass, said member comprising:

a hollow, cylindrical shell portion, said shell portion transmitting a part of the axial load F and the torque load T, said shell portion having a diameter D and a mass $M_S$;

a fin integral with said shell portion, said fin comprising a helix extending the length of the shell portion and having a mass $M_F$;

wherein the angle of said helix is such that when the value of the ratio $D \times F/T$ is less than 3, the optimum helix angle will be greater than 30°, but less than 55°, and when the value of the ratio is greater than 3, the optimum helix angle will be less than 30°, and wherein the ratio of the fin mass to the shell mass—$M_F/M_S$—is greater than .2 but less than 1.5, so as to enable said fin to transmit the remainder of said loads F and T to a total minimum weight of said member in said nuclear radiation environment.

7. A torque and axial load transmitting member for use in a nuclear radiation environment wherein temperature rise in the member is substantially proportional to its mass, said member comprising:

a hollow, cylindrical shell portion, said shell portion transmitting a part of the axial load F and the torque load T, said shell portion having a diameter D;

a fin integral with said shell portion, said fin comprising a helix extending the length $s$ of the shell portion and having an angle $\theta$;

wherein the angle $\theta$ of said helix is such that said fin makes at least one complete revolution of said cylindrical shell portion along said length $s$, and wherein the angle $\theta$ of said helix is such that when the value of the ratio $D \times F/T$ is less than 3, the optimum helix angle will be greater than 30°, but less than 55°, and when the value of the ratio is greater than 3, the optimum helix will be less than 30°, so as to enable said fin to transmit the remainder of said loads F and T at a minimum total weight of said member in said nuclear radiaiton environment.

8. A torque and axial load transmitting member for use in a nuclear radiation environment wherein temperature rise in the member is substantially proportional to its mass, said member comprising:

a hollow, cylindrical shell portion, said shell portion transmitting a part of the axial load F and the torque load T, said shell portion having a diameter D;

a fin integral with said shell portion, said fin comprising a helix extending the length $s$ of the shell portion and having a height $d$ and a pitch $p$;

wherein the ratio of the fin height to the fin pitch—$d/p$—is greater than .1 and less than 2.0, and wherein the ratio of the total surface area of the fin and shell portion combined to that of the surface area of an unfinned load transmitting member of equal diameter D, is approximately 2, so as to enable said fin to transmit the remaining part of said loads F and T at a minimum total weight of said member in said nuclear radiation environment.

No references cited.